United States Patent [19]
Henson

[11] 3,805,092

[45] Apr. 16, 1974

[54] ELECTRONIC ANALOG MULTIPLIER

[75] Inventor: Howard K. Henson, Tucson, Ariz.

[73] Assignee: Burr-Brown Research Corporation, Tucson, Ariz.

[22] Filed: June 25, 1973

[21] Appl. No.: 373,447

[52] U.S. Cl. .................. 307/229, 307/230, 328/160, 328/145

[51] Int. Cl. ............................................ H03k 17/00

[58] Field of Search ............ 328/160, 145; 307/254, 307/229, 230; 235/150.52

[56] References Cited

UNITED STATES PATENTS

| | | | |
|---|---|---|---|
| 3,714,462 | 1/1973 | Blackmer | 328/160 X |
| 3,764,908 | 10/1973 | Elms | 328/160 |

*Primary Examiner*—Rudolph V. Rolinec

*Assistant Examiner*—B. P. Davis

*Attorney, Agent, or Firm*—Cahill, Sutton & Thomas

[57] ABSTRACT

An electronic analog multiplier is disclosed utilizing four transistors connected in a loop. Input signals to be multiplied are applied to the collector electrodes of two of the transistors to establish collector currents therein; a biasing signal is applied to the collector electrode of the three transistors to establish a collector current. The establishing of the collector currents in three of the four transistors connected in the loop results in the biasing of the fourth transistor which then provides an antilog function to develop a collector current proportional to the product of the input signal currents. Variations of the transistor gains among the transistors connected in the loop induces a linear error which may readily be corrected by adjusting input resistances in the input signal paths. A compensation resistor is connected between the base electrodes of the first and fourth transistors of the loop; the compensation resistor is provided with a compensation current derived from the collector electrode of the fourth transistor. The compensation current is adjusted by setting the value of the compensation resistor, which provides a correction for the error in the circuit created by the ohmic resistances of the transistor emitters.

3 Claims, 3 Drawing Figures

ELECTRONIC ANALOG MULTIPLIER

The present invention relates to electronic analog multipliers, and more particularly, to analog multipliers of the type utilizing bipolar transistors and the logarithmic relationship of the emitter current to the base-emitter voltage thereof.

Analog multiplication has been performed with a variety of circuit configurations and is usually a compromise between high speed operation and high accuracy. Attempts have been made at achieving both high speed and high accuracy at the expense of substantial complexity. For a discussion of typical analog multiplication techniques, reference may be had to *Operational Amplifiers; Design and Application*, G. Tobey, J. Graeme, L. Huelsman, McGraw-Hill Book Company, New York, 1971, pp 268–280.

High speed or high frequency response in electronic multiplication is usually attained by resorting to simplier circuit configurations but with an attendant degradation in accuracy. Many of the simplier circuit utilizations perform the multiplication through use of the exponential current-voltage relationship of bipolar transistors. This relationship is expressed by the well-known formula $$i_e = I_s e^{qv_{be}/KT} \text{ or } v_{be} = KT/q \ ln \ i_e/I_s$$

where, $i_e \triangleq$ emitter current
$v_{be} \triangleq$ emitter-base voltage
$I_s \triangleq$ reverse saturation current
$K \triangleq$ Boltzman's constant
$q \triangleq$ electron charge
$T \triangleq$ Temperature in ° D Using the above exponential relationship and its logarithemic reverse, the multiplication function is performed by logarithemic techniques. Voltages are generated which are related to the logarithms of input signal currents. The voltages are then added and the antilog of the sum is found using the exponential characteristic. The result of the derivation of the analog is proportional to the product of the original signal currents. This technique, although well known, induces two significant sources of error which limit the accuracy of the technique. Specifically, the errors are: first, the mismatching of transistor junctions inherent in the production of PN junctions; and second, the ohmic resistances of the transistor emitters. In prior art circuit configurations, both of these error sources induce errors that are difficult, if not impossible, to compensate. The errors are particularly troublesome because they are signal dependent and are not susceptible to compensation by linear compensation techniques. These non-linear errors are difficult to remove and usually limit error reduction to approximately one percent (1 percent) of full scale. A discussion of high speed analog multipliers encountering such difficulties may be found in *IEEE* Journal of Solid-State Circuits, "A Precise Four-Quadrant Multiplier with Subnanosecond Response," B. Gilbert, December 1968.

It is therefore an object of the present invention to provide an electronic analog multiplier utilizing the exponential current-voltage relationship of bipolar transistors.

It is also an object of the present invention to provide an electronic analog multiplier that incorporates the utilization of exponential current-voltage relationship of bipolar transistors and operates at a relatively high operating speed or frequency response without the attendant non-linear errors normally encountered in such multipliers.

It is still another object of the present invention to provide an electronic analog multiplier incorporating the exponential current-voltage relationship of bipolar transistors wherein the mismatches between the transistor junctions and the error induced by ohmic resistances of the transistor emitters are readily compensated and are rendered linear.

It is yet another object of the present invention to provide an electronic analog multiplier incorporating the exponential current-voltage relationship of bipolar transistors wherein the mismatches between the transistor junctions and the error induced by ohmic resistances of the transistor emitters are readily compensated and are rendered linear, and which exhibits a low error driven with temperature.

These and other objects of the present invention will become apparent to those skilled in the art as the description thereof proceeds.

The present invention may more readily be described by reference to the accompanying drawings, in which.

Figure 1:
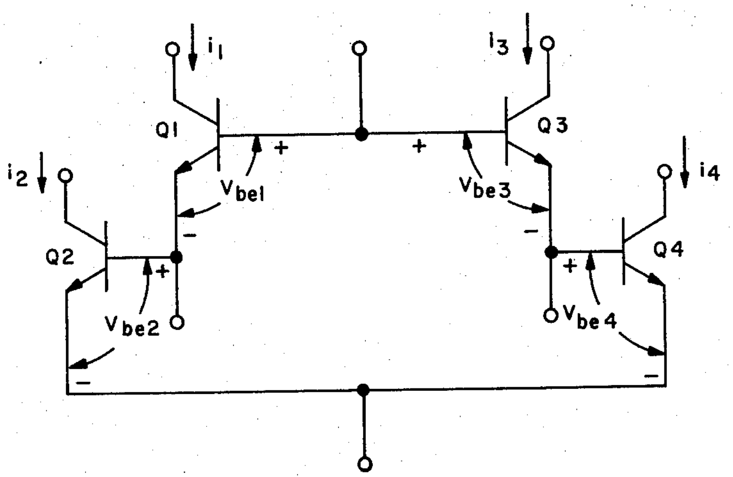
FIG. 1 is a partial schematic circuit diagram useful in the description of the present invention.

The present invention may be described by first referring to FIG. 1, wherein a plurality of transistors $Q_1$, $Q_2$, $Q_3$, and $Q_4$ are shown connected to form a loop. The emitter of $Q_1$ is connected to the base of $Q_2$; the emitter of $Q_2$ is connected to the emitter of $Q_4$, while the emitter of $Q_3$ is connected to the base of $Q_4$. The emitter currents are indicated by $i_1$, $i_2$, $i_3$, and $i_4$ respectively. Biasing means has been eliminated for purposes of description of FIG. 1.

If the base-to-emitter voltage of transistors $Q_1$, $Q_2$ and $Q_3$ are established in a predetermined manner, the base-to-emitter voltage of transistor $Q_4$ may be determined in accordance with the following equation:

$$V_{be4} = v_{be1} + v_{be2} - v_{be3}$$

Further, if we incorporate an input signal into the collector currents of $Q_1$ and $Q_2$ together with a predetermined biasing current while utilizing only a biasing current for $Q_3$, the resulting collector current in $Q_4$ will be a function of the input signal currents occurring in the collector electrodes of $Q_1$ and $Q_2$. The emitter-base voltages of the transistors are logarithmicly related to the collector currents, so the loop biases the fourth transistor with the sum and difference of logarithm of the established signals imposed on the collector electrodes of the three transistors $Q_1$, $Q_2$, and $Q_3$. With these collector currents established, the fourth transistor $Q_4$ performs an antilog function to develop a collector current of $$i_4 = (I_{s3}I_{s4}/I_{s1}I_{s2}) \cdot (i_1i_2/i_3)$$

where equal transistor current gains are assumed.

It may be noted that the above resulting current in the collector of transistor $Q_4$ is proportional to the product of the currents in the collector electrodes of transistors $Q_1$ and $Q_2$; however, a ratio function is present and is represented by the ratio of saturation currents of the respective transistors (it will be remembered that the collector current in the collector electrode of transistor $Q_3$ is a result of a fixed bias). This ratio of saturation current is a direct result of the degree of junction matching among the four transistors. It can therefore be seen that the junction mismatching, when the transistors are placed in a loop such as shown in FIG. 1, results in a fixed gain error and does not result in a signal dependent error to which prior art circuits have been subject. Since this gain error is a fixed quantity, the error is readily compensated by simply adjusting input resistances to the collector electrodes of transistors $Q_1$ and $Q_2$.

Figure 2:
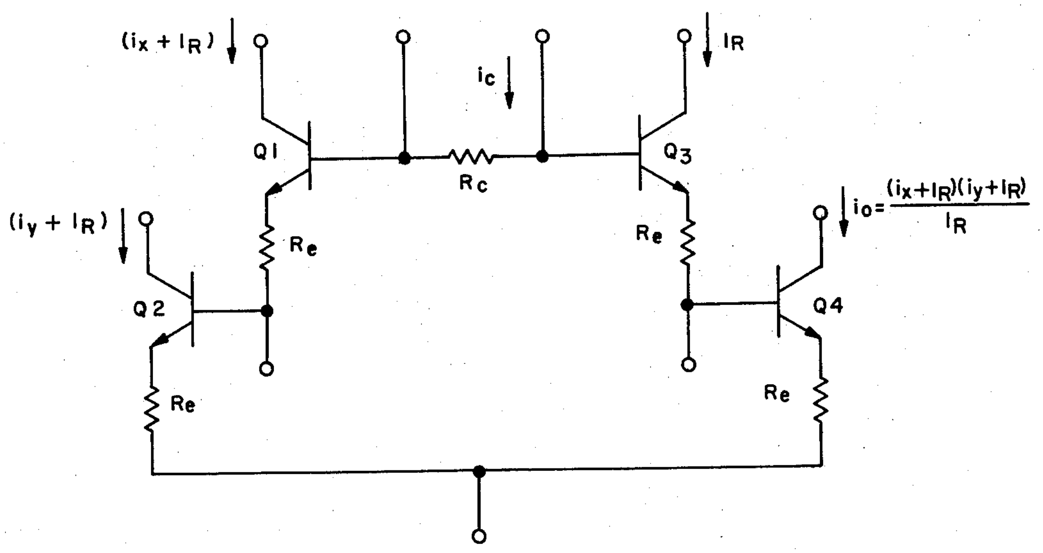
FIG. 2 is a partial schematic circuit diagram useful in the description of the present invention.

As mentioned previously in connection with the description of prior art techniques, circuits depending on the logarithmic or exponential current-voltage relationship of bipolar transistors also incorporate an error created by the ohmic resistances of the transistor emitters. With the transistor loop of the present invention, a feedback signal is readily generated which, like the ohmic resistance, is directly related to the output product-quotient term. The system of the present invention therefore readily generates a correction signal to be fed back into the transistor loop to compensate for the ohmic resistances of the transistor emitters. This latter feature can more readily be described by reference to FIG. 2, wherein each of the transistors are shown as they were in FIG. 1 but also incorporate resistances $R_e$ shown in series with the respective emitters to represent the emitter resistances. In FIG. 2, the input signal currents imposed by a suitable biasing technique (not shown in FIG. 2) is represented by the term $I_R$. The representation of the collector current terms in their separate signal and bias components facilitates the explanation of the development of a compensating current to offset the linearity error produced by the ohmic resistances of the respective transistor emitters. With the input currents to $Q_1$ equal to $i_x + I_R$, the input current to the emitter electrode of transistor $Q_2$ equal to $i_y + I_R$ and the input current to emitter electrode of $Q_3$ equal to $I_R$ (only biasing current is provided to $Q_3$), the resulting output current may be represented as:

$$i_o = (i_x + I_R)\ (i_y + I_R)/I_R$$

It may be noted that this output current would normally have an added error term due to the ohmic resistances of the respective transistor emitters if it were not for the compensation current $i_c$ flowing in a compensation resistor $R_c$ connected between the base electrodes of $Q_1$ and $Q_3$. To find the magnitude of the compensation current $i_c$ necessary to eliminate the error term otherwise occurring in the equation for $i_o$, the net compensation error around the loop comprising transistors $Q_1$, $Q_2$, $Q_3$, and $Q_4$ is equated to zero.

$$\epsilon = (i_x + I_R)R_e + (i_y + I_R)R_e - I_R R_e - i_o R_e - i_c R_c = 0$$

With the expression for $i_o$ of FIG. 2 the required compensation current is found to be $$i_c = -\ (i_x i_y / I_R)\ (R_c/R_e)$$

It may be noted that the expression given above for the compensation current $i_c$ is proportional to the product in the input signal currents $i_x$ and $i_y$; therefore, an output signal derived from the collector electrode of $Q_4$ is appropriately proportional to the required compensation current $i_c$ and need be altered only by a fixed ratio of resistances $R_c/R_e$. Since the resistance $R_e$ is integral with the emitter (it is the emitter resistance), the value of the compensation resistance or resistor $R_c$ may be chosen to produce the necessary compensation current $i_c$ to correct for the error created by the ohmic resistances of the transistor emitters.

Since the ohmic resistance of the respective transistor emitters is being compensated for by a resistance, the thermal drift of the error correction may further be compensated for by the use of monolithic integrated circuit fabication. Such fabrication techniques are well known in the industry and permit the use of a compensation resistance $R_c$ that is formed by the same processes and conditions that create the ohmic emitter resistance. In this way, the resistances of the respective transistor emitters and the compensation resistor $R_c$ will have matched thermal characteristics and the drift of the error is compensated by a drift in the correction signal developed by the correction current $i_c$ and correction resistance $R_c$. The combined benefit of the thermal drift error correction with the corrections for transistor junction mismatch and transistor emitter ohmic resistance is an electronic analog multiplier having the high speed normally associated with exponential current-voltage bipolar transistor techniques but with a reduction in linearity error to around one-tenth of one percent (1 percent) or significantly less than the linear error heretofore encountered in such analog multipliers. The speed of operation of the multiplication of the present invention is limited only by the high gain-bind width product of the transistors.

Figure 3:
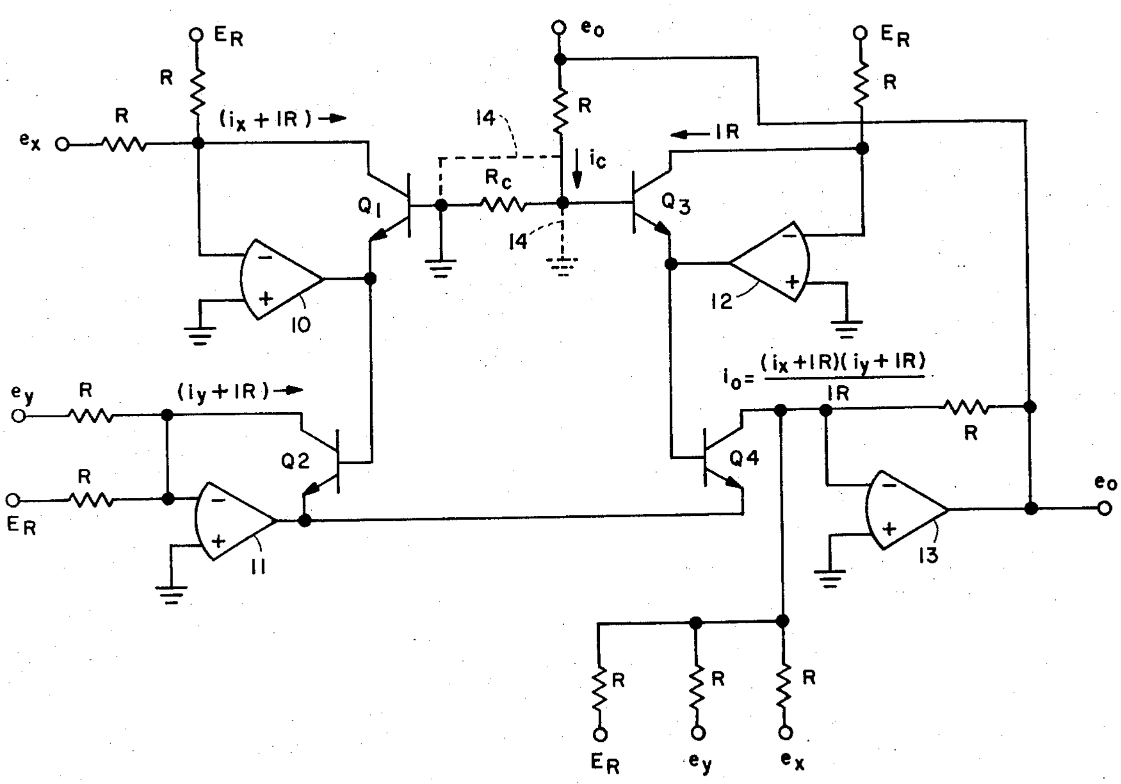
FIG. 3 is a circuit diagram of an electronic analog multiplier constructed in accordance with the teachings of the present invention.

Numerous biasing techniques can be used to complete the multiplied circuit. One such biasing technique is shown in FIG. 3, wherein transistors $Q_1$, $Q_2$, $Q_3$, and $Q_4$ are shown connected to operational amplifiers 10, 11, 12, and 13 respectively. Input resistances R are shown and the input signals as well as a biasing signal are shown in potential form as $e_x$, $e_y$ and $E_R$. For convenience, the respective collector electrode currents are shown as is the output signal $e_o$. In the biasing technique shown in FIG. 3, it may be noted that the biasing potential $E_R$ is applied to all the operational amplifiers 10 – 13. The input signals $e_x$ and $e_y$ are applied to the collector electrodes of $Q_1$ and $Q_2$ respectively, while they are also applied to the collector electrode of $Q_4$ (the biasing potential $e_R$ is applied to the collector electrode of $Q_4$ to remove DC biasing level otherwise occurring in the output signal while the input signal potentials $e_x$ and $e_y$ are also applied to the collector electrode of $Q_4$ to cancel out the proportional term otherwise resulting from the application of the biasing potential to the loop). With the system shown in FIG. 3, the output signal $e_o$ is proportional to the product of the input signals $e_x$ and $e_y$ in accordance with $e_o = e_x e_y / E_R$. Input signals $e_x$ and $e_y$ combine with the reference bias $E_R$ to develop the collector currents shown in FIGS. 2 and 3. The resulting output collector current, shown in FIGS. 2 and 3, is combined with the currents from $e_x$, $e_y$, and $E_R$ to produce the above output voltage. To calibrate and correct for errors from junction mismatches, an appropriate input resistor R is adjusted; to correct for the linearity of ohmic emitter resistances of the respective transistors, the output signal supplies a correction signal current $i_c$ to the compensation resistor $R_c$. The value of the compensation signal may be adjusted by appropriately adjusting the value of $R_c$. It may be noted that the polarity of the current $i_c$ may be chosen in accordance with numerous other circuit influences thereon and the connection of the current $i_c$ to the compensation resistor $R_c$ may be effected by utilizing the connections shown in FIG. 3 by broken lines 14.

It will be obvious to those skilled in the art that the same analog multiplier performance is achieved if the NPN transistors chosen for illustration in FIGS. 1 – 3 are replaced with PNP transistors. It will also be obvious that additional pairs of transistors can be added to the loop shown to develop output signals that include additional product and quotient terms and that a great variety of biasing techniques can be implemented to realize the desirable features of the transistor loop shown and described in the accompanying figures.

I claim:

1. In an electronic analog multiplier of the type adapted for receiving first and second electrical input signals and for providing an output signal proportional to the product of said first and second input signals, said multipler incorporating a plurality of bipolar transistors, each having an emitter electrode, a collector electrode, and a base electrode, said multiplier including biasing means for biasing said transistors, the improvement comprising: first, second, third, and fourth transistors; means connecting the emitter electrode of said first transistor to the base electrode of said second transistor; means connecting the emitter electrode of said third transistor to the base electrode of said fourth transistor; means connecting the emitter electrode of said second transistor to the emitter electrode of said fourth transistor; a compensation resistor having first and second resistor terminals connected between the base electrode of said first and third transistors; said compensation resistor having a resistance value chosen to correct for error created by ohmic resistances of the transistor emitters; means connecting the collector electrode of said fourth transistor to one of said resistor terminals to provide a correction current to said compensation resistor; first terminal means connected through a first input resistor to the collector electrode of said first transistor for receiving a first signal to be multiplied in said multiplier; second terminal means connected through a second input resistor to the collector electrode of said second transistor for receiving a second signal to be multiplied in said multiplier; said first and second input resistors having resistance values chosen to correct for errors from junction mismatches among said transistors; and third terminal means connected to the collector electrode of said fourth transistor for supplying an output signal proportional to the product of said first and second signals.

2. The combination set forth in claim 1, wherein said transistors are NPN type.

3. The combination set forth in claim 1, wherein said transistors are PNP type.

* * * * *